(12) United States Patent
Pietruszka

(10) Patent No.: US 6,944,282 B1
(45) Date of Patent: Sep. 13, 2005

(54) ARRANGEMENT FOR USING A NUMBER OF MODIFIABLE SETTINGS

(75) Inventor: Jörg Pietruszka, Bochum (DE)

(73) Assignee: Nokia Mobile Phones Ltd., Espoo (FI)

( * ) Notice: Subject to any disclaimer, the term of this patent is extended or adjusted under 35 U.S.C. 154(b) by 678 days.

(21) Appl. No.: 09/652,067

(22) Filed: Aug. 31, 2000

(30) Foreign Application Priority Data

Sep. 10, 1999 (DE) ................. 199 43 342

(51) Int. Cl.⁷ .......................... H04M 1/275
(52) U.S. Cl. .............. 379/355.02; 455/420; 455/557; 235/384; 340/439
(58) Field of Search ............... 455/420, 557; 379/365; 235/384; 340/439

(56) References Cited

U.S. PATENT DOCUMENTS

| | | | |
|---|---|---|---|
| 5,239,700 A | | 8/1993 | Guenther et al. |
| 5,633,484 A | * | 5/1997 | Zancho et al. ........... 235/380 |
| 6,032,089 A | * | 2/2000 | Buckley ................ 701/36 |
| 6,041,229 A | * | 3/2000 | Turner ................. 455/420 |

FOREIGN PATENT DOCUMENTS

| | | | |
|---|---|---|---|
| DE | 195 31 415 | 2/1997 | |
| DE | 19630857 | 2/1998 | |
| DE | 19823122 | 12/1999 | |
| GB | 2 315 954 | 2/1998 | |
| WO | WO 9819226 A1 * | 5/1998 | ........ H04M 1/02 |

* cited by examiner

*Primary Examiner*—Sinh Tran
*Assistant Examiner*—Daniel Swerdlow
(74) *Attorney, Agent, or Firm*—Alfred A. Fressola; Ware, Fressola, Van Der Sluys & Adolphson LLP

(57) ABSTRACT

The invention concerns arrangements whereby a number of modifiable settings can be used, where at least some of these settings are stored as individual values in a memory and are or become available to a user as preset values. To that end it is proposed to store the individual values in an arrangement for mobile communications and make them available to the respective arrangement when both arrangements are connected. A modification of the arrangement for mobile communication is not required if the individual values are stored as telephone numbers.

16 Claims, 3 Drawing Sheets

ARRANGEMENT FOR USING A NUMBER OF MODIFIABLE SETTINGS

BACKGROUND OF THE INVENTION

1. Technical Field

The invention concerns arrangements whereby a number of modifiable settings can be made, where at least some of these settings are stored as individual values in a memory and as such are or become available to a user as preset values.

2. Background of the Invention

Arrangements with a number of modifiable settings, at least some of which are stored as individual values in a memory and are available as preset values to a user, are well known in the state of the art. Thus it is usual in television technology that when a user generates individual settings which deviate for example from factory settings, they are stored upon request as individual settings or individual values, and are made available to the user during a subsequent use of the arrangement. This principle is also used in automobile technology, where for example the seat, steering wheel and/or mirror settings are stored in accordance with the driver's specifications. If another driver takes over and individual values were previously stored for this driver, the new driver can retrieve the individual values assigned to a person from the memory, whereby the settings corresponding to the individual values can be carried out by corresponding servomotors. As can easily be seen, corresponding memories are required to store the individual values. Furthermore corresponding actuating devices are required to set the individual values. Since when the respective devices are being produced it is often not clear in what connection the device will be used, or with what other devices the respective arrangement will operate, each one of these arrangements is equipped with a memory and a corresponding actuator, which makes the cost per arrangement relatively high.

SUMMARY OF THE INVENTION

It is therefore the object of the invention to propose arrangements that reduce the cost when at least two not necessarily equally constructed arrangements are used.

This object is achieved an arrangement with a number of modifiable settings, at least some of which are stored as individual values in a memory and are available as preset values to a user, characterized in that a telephone keyboard is provided, that at least a part of the memory range is such that it is used exclusively for recording and storing telephone numbers and which is addressable via the keyboard, that at least some of the individual values are stored as telephone numbers in the memory areas. It is also achieved by an arrangement with a number of modifiable settings, characterized in that a telephone keyboard and a memory are provided, that at least a part of the memory range is such that it is used exclusively to record and store telephone numbers and is addressable via the keyboard, that individual values which correspond to determined presettings for the arrangement are stored as telephone numbers in the memory areas.

The effort of storing individual values is simplified significantly if the memory of a telephone that is addressable from a telephone keyboard and can store telephone numbers is used, and the respective individual values are stored there as telephone numbers. In that case it is particularly advantageous to use the memory areas of a mobile telephone which are designated for storing telephone numbers. Mobile telephones on the one hand have available a nearly unlimited number of memory areas. In addition the storage of individual values in the memory areas of a mobile telephone is practical because such devices are always carried along by the user and therefore ensure that other arrangements can adapt to the user's special requirements as soon as the individual values stored in memory areas of the "telephone register" become available to them. In a typical motor vehicle situation this can mean that after driver A has left the vehicle and driver B wants to use the vehicle, the optimum seat positions adjusted for driver B or his/her radio programs as well are provided when the mobile telephone is connected to the vehicle through an on-board interface. Since the mobile telephone as a rule has its own keyboard and a display screen, the setting of the respective individual values of the different arrangements can be carried out at least partially with the mobile telephone. The latter is especially advantageous in motor vehicles because activation devices, which are otherwise needed to activate these arrangements or to release the stored individual settings, become fully or at least partially unnecessary.

It should be pointed out here that using the memory areas which are otherwise used to store only telephone numbers makes it unnecessary to modify the telephone. In particular, every telephone containing a call number memory can be used in connection with the invention. This does not mean however that the invention is limited to telephones that are provided with a call number memory. If the telephones being used also have a memory area for storing individual setting values in addition to the call number memory area, the user guidance for storing individual values is considerably improved since in that case a menu for storing individual values can be provided.

If a unit is provided, it can differentiate between stored telephone numbers and individual values and provides the respective settings after determining the individual values, thereby ensuring that when the arrangement equipped with the "telephone register" is connected to a corresponding interface which establishes the connection to the other arrangements, the respective settings can be brought about very quickly.

The unit can be an evaluation circuit which differentiates between a typical telephone number and numbers representing individual values for predetermined settings, from among the volume of numbers stored in the different memory areas.

A rapid individual setting is also provided if determined storage places in the memory or in the "telephone register" are reserved for individual values, because in that case it is not necessary to search the entire "telephone register" but only a few memory areas, once the arrangement with the "telephone register" is connected by an interface to one or several arrangements.

BEST MODE TO CARRY OUT THE INVENTION

The invention will now be explained in greater detail by means of the figures.

Figure 1:
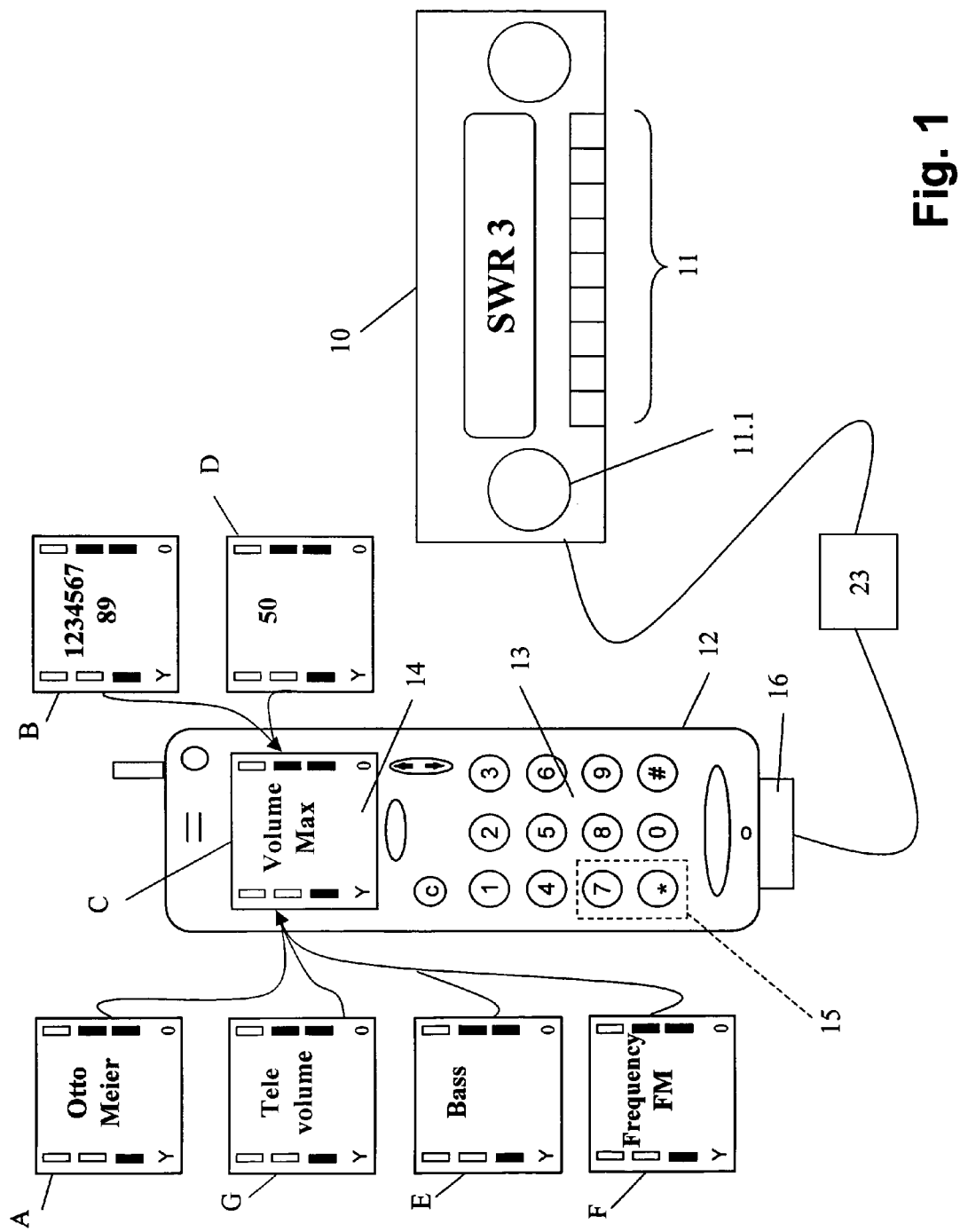
FIG. 1 is an embodiment according to the invention showing various information that can be shown on the display under designations A through G.

FIG. 1 shows an arrangement (10) in the form of a car radio, which contains a number of means (11) for establishing settings. The arrangement (10) also has a memory (100) (shown in phantom) wherein determined settings that were established by a user can be stored as individual values. If a user has stored individual values in the memory, the pre-established settings which correspond to the individual values are always available to a user when he activates the arrangement. This means for example that when the arrangement (10) is activated, the radio station SWR 3 is sought as a preset value and is made available. If the user has also preset a volume limit, he/she cannot raise the volume above the preset level even if he/she activates the corresponding means 11.1.

FIG. 1 also shows a mobile telephone (12) which essentially comprises a keyboard (13), a display screen (14) and a memory (15) for storing telephone numbers. The memory (15) (shown in phantom) of this commercial mobile telephone (12) can receive a number of telephone directory entries, in which for example in addition to the actual call number, the name of the person linked to this call number can also be stored. For example if the user has stored the call number 123456789 in the memory (15) under the name of Otto Meier, in order to establish a call and depending on the configuration of the mobile telephone (12) or its settings, he/she can have the stored call number, the name linked to the call number or both displayed on the screen (14). To clarify the alternative way of illustrating the mobile telephone (12) in FIG. 1, the screen A is in the name display mode and screen B is in the call number display mode.

It can furthermore be seen in FIG. 1 that the mobile telephone (12) is connected by an interface (16) to the arrangement (10). The following steps are necessary if a user wants to ensure for example by manual settings of the arrangement (10) that the volume can never be raised above 50% of the maximum volume: in the same way as when a combination of a call number and name is stored, depending on the configuration of the mobile telephone (12) either the call number is entered first and then the name, or vice versa, where however a concept that characterizes the respective function must be entered as the name. Since the "volume max" concept of the embodiment shown in FIG. 1 is to be characteristic for the desired volume limit, if the user actually wishes to establish a 50% limit of the maximum volume he/she must for example enter the number 50 from the keyboard (13) as the "call number" under the "volume max" name. If the screen (14) of the mobile telephone (12) in FIG. 1 can only display the name or the call number, and the user has proceeded as described above, in the name display mode the screen (14) shows what is designated by C in FIG. 1, while in the call number display mode the number sequence "50" appears on the screen (14) under designation D in FIG. 1.

In the same way the user could also establish sound settings by entering the appropriate value with the keyboard (13) of the mobile telephone (12) under the word 'bass' (see designation E).

It is also possible for example to store a frequency for a radio transmitter in the memory (15) of the mobile telephone (12) under the word frequency FM. This is made clear in designation F.

In another embodiment the concept "Tele volume" (designation G) can have the function that, with an existing intercom station and reproduction of the telephone sound via the loudspeakers (not illustrated) which are connected to the arrangement (10), when a telephone conversation takes place and the manually adjusted loudness is below the value that was entered from the keyboard (13), it increases the audibility of the loudness to a previously entered value.

Figure 2:
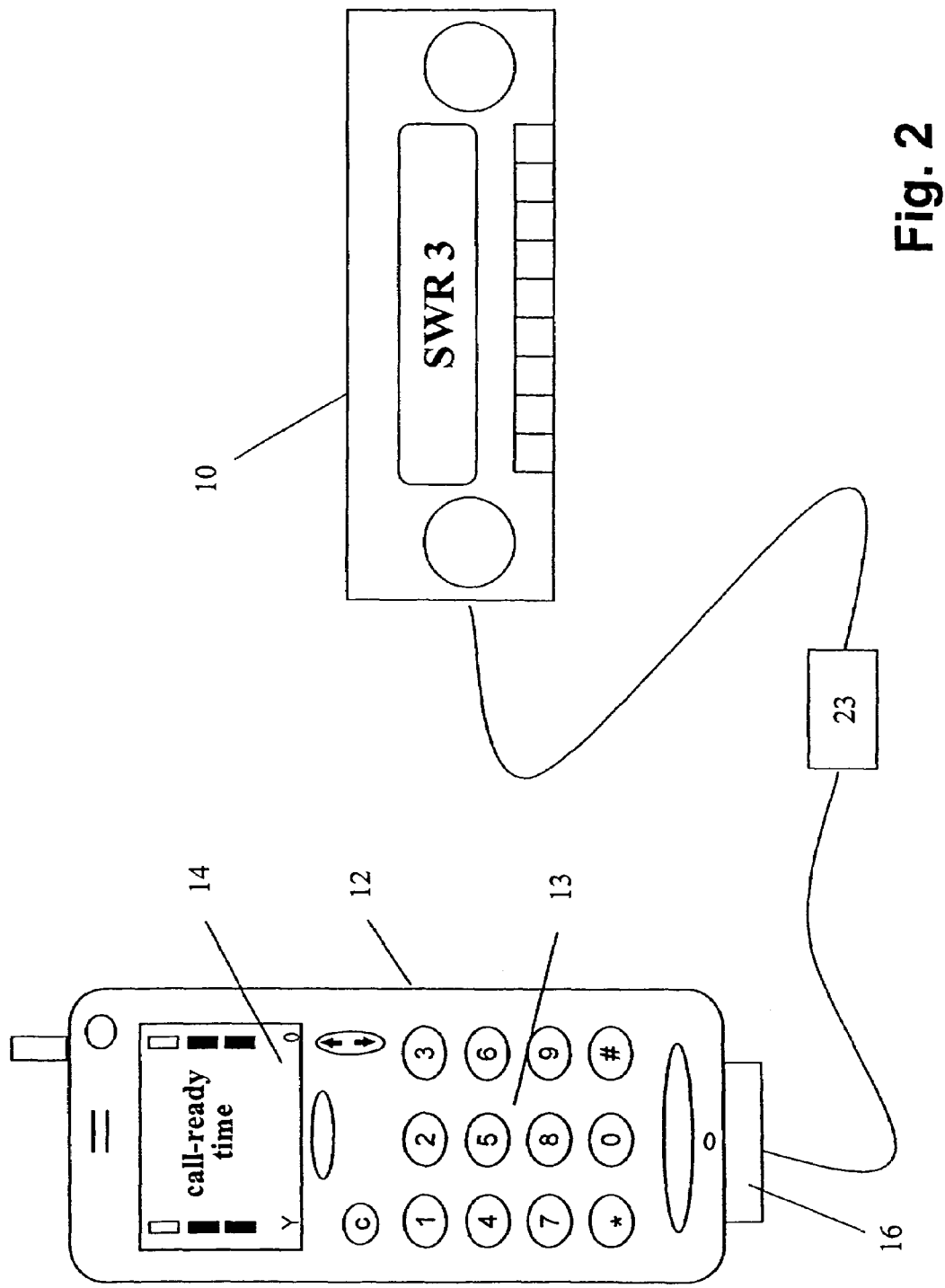
FIG. 2 is a further embodiment according to FIG. 1.

FIG. 2 shows another application of the invention. There the word "call-ready time" can be seen on the screen (14). If a user has entered a period of about 45 minutes with the keyboard (13), it lets the mobile telephone (12) remain call-ready 45 minutes after the radio and/or the motor vehicle is turned off. This availability of the mobile telephone (12) allows the mobile telephone (12) to remain usable even during a short-term travel interruption. The fact that the mobile telephone (12) remains active during the recorded call-ready time does not significantly increase the theft risk, since the settable call-ready time is relatively short.

Figure 3:
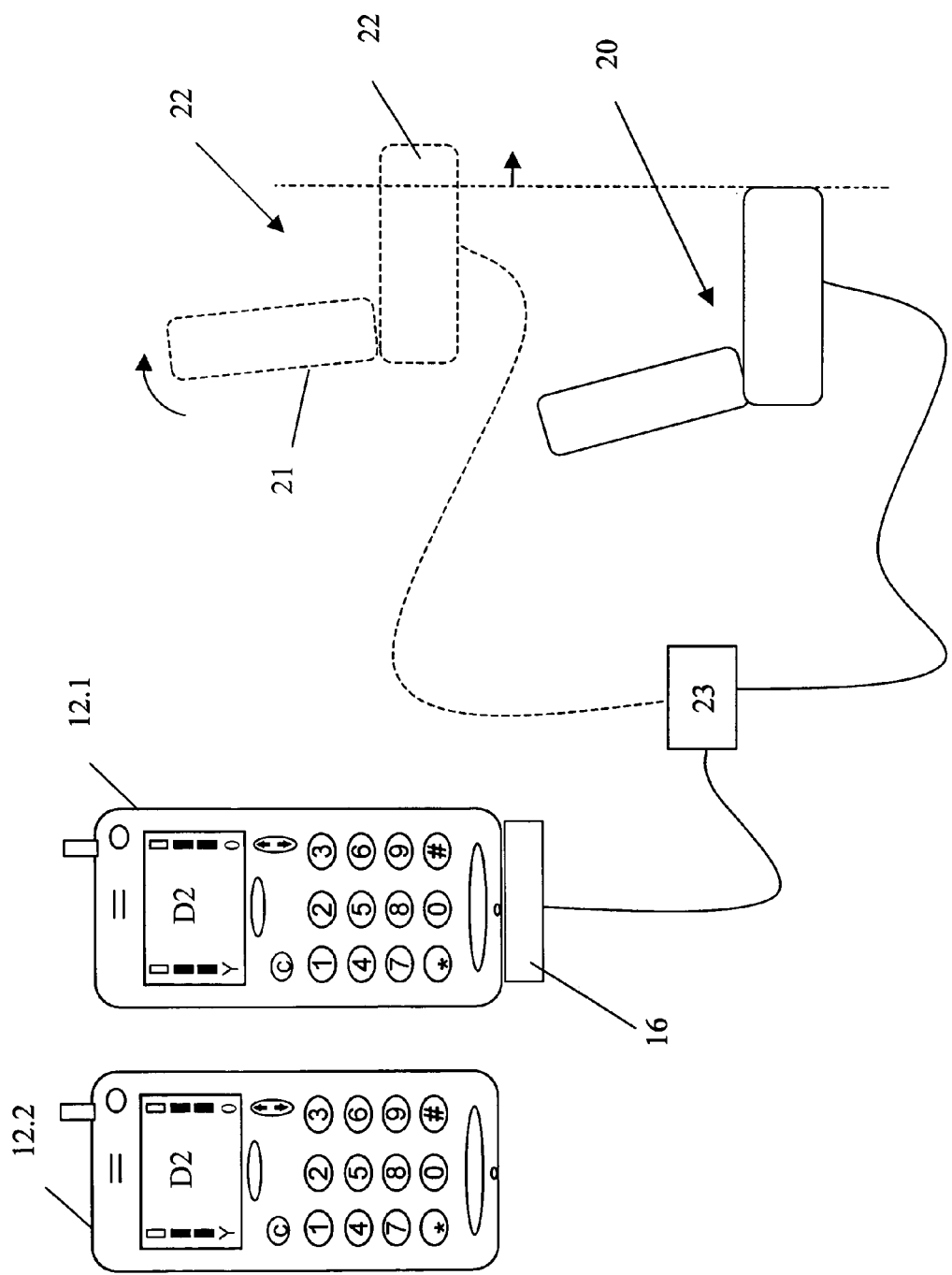
FIG. 3 is another embodiment according to the invention.

The embodiment in FIG. 3 differs from the previous examples in that the mobile telephone 12.1 is connected to the electrically adjustable driver seat (20) of a motor vehicle (not illustrated) by the interface (16). The shown position of the driver seat (20) is entered for example with the number sequence 182783464 in the memory (15) of the mobile telephone (12.1) under the "seat adjustment" concept. If the number sequence 374745 for example was also recorded in the mobile telephone (12.2) under the "seat adjustment" concept and the mobile telephone (12.2) is connected to the interface (16), this setting causes the previous setting of the driver seat (20) (shown by solid lines in FIG. 3) to be changed in accordance with the number sequence 374745 stored in the mobile telephone (12.2). These changes of advancing the seat surface (21) and increasing the angle of the seat back (22) are shown by broken lines in FIG. 3. Although it is possible to input a number sequence which changes the respective seat setting under the "seat adjustment" concept, it must be viewed as impractical due to the lengthy number sequence that must be entered for the complex seat position. This problem could however be eased by entering separate settings for the "seat height", "tilt angle" etc. concept. But it is significantly more advantageous if the entire seat setting made by the driver is recorded as a number sequence by the vehicle and is made available as such under the "seat adjustment" concept to the mobile telephone (12) which is respectively connected to the interface (16), and is stored there.

For reasons of completeness it should be pointed out that the transfer of number sequences to the respective mobile telephone (12) or its memory (15) is not limited to the preceding seat adjustment. The transfer can also be used with settings established according to FIG. 1 in the arrangement. In both cases it is only important that when number sequences are transferred to the respective mobile telephone (12), the reserved concepts "volume max", "bass", "seat adjustment" are connected to the respective number sequences.

If the arrangement (10) itself has a memory (see memory (100)) in which determined preset values are stored, these preset values can be transferred to the mobile telephone (12) in the manner described above as soon as the mobile telephone (12) is connected to the interface (16). For purposes of clarification it should be pointed out that a memory for preset values in the arrangement (10) itself is not required. Nor does the arrangement (10) require any manual input means (11), since the entire input can be provided from the keyboard (13) of the mobile telephone (12).

In conclusion the procedures that take place for example when the mobile telephone (12) or a motor vehicle is connected with an interface (16) according to FIG. 1 have been explained. To bring about the settings stored in the memory (15) of the mobile telephone (12), the respective concepts "volume max", "seat adjustment" etc. are transferred with the corresponding number sequences to the unit (23) via the interface (16). Since the respective concepts are reserved concepts, only the number sequences stored for that purpose are evaluated, and according to the respective evaluation and/or conversion they are transferred to the arrangement (10) in FIG. 1, or to the (not illustrated) servomotors in FIG. 3 to establish the corresponding settings.

What is claimed is:

1. A system for communicating modifiable settings comprising:
    a mobile telephone (12), and
    at least one device (10; 20, 22);
    wherein the mobile telephone (12) has:
        a memory (15) for storing telephone numbers and associated names, wherein at least some of said memory can store individual values that represent modifiable settings for use in said at least one device and associated function names;
        a keyboard (13) for addressing said memory; and
        an interface (16, 23) for receipt of said at least some of said individual values that represent modifiable settings and associated function names so as to transfer at least some of said individual values that represent modifiable settings to said at least one device; and
    wherein the at least one device has a memory (100) for storage of a number of modifiable settings;
    and wherein said at least one device (10; 20, 22) is connectable with said mobile telephone (12) via said interface (16, 23) for addressing the memory (15) in the mobile telephone to transfer, based upon the associated function names the individual values of the modifiable settings from the memory (15) in the mobile telephone to the memory (100) of the at least one device via said interface.

2. A system as claimed in claim 1, characterized in that determined areas of the memory of the mobile telephone are reserved for individual values.

3. A system as claimed in claim 1, characterized in that a unit is provided which differentiates between stored telephone numbers and stored individual values, and brings up the respective settings after individual values have been determined.

4. A system as claimed in claim 3, characterized in that the unit is an evaluation device which ascertains the difference by means of reserved concepts.

5. A system as claimed in claim 1, wherein the at least one device is an electrically adjustable driver seat (20) and wherein one modifiable setting is a seat adjustment to which the electrically adjustable driver seat is responsive.

6. A system as claimed in claim 1, wherein the at least one device is a radio in a motor vehicle and wherein modifiable settings of the radio include volume and frequency.

7. A system for communicating modifiable settings comprising:
    a mobile telephone (12), and
    at least one device (10; 20, 22);
    wherein the mobile telephone (12) has:
        a memory (15) for storing telephone numbers, wherein at least some of said memory can store individual values that represent modifiable settings for use in said at least one device;
        a keyboard (13) for addressing said memory; and
        an interface (16, 23) for communicating said at least some of said individual values that represent modifiable settings to said at least one device; and
    wherein the at least one device has a memory (100) for storage of a number of modifiable settings;
    wherein said at least one device (10; 20, 22) is connectable with said mobile telephone (12) via said interface (16, 23) for addressing the memory (15) in the mobile telephone to transfer the individual values of the modifiable settings from the memory (15) in the mobile telephone to the memory (100) of the at least one device as claimed in claim 1; and
    wherein the at least one device is a car hands-free unit and wherein one modifiable setting is the switch-off-time that the hands-free unit is operational after the car is turned off; whereby the mobile telephone is operational for the amount of time determined by the switch-off-time.

8. A mobile telephone for storing modifiable settings for use in at least one device having a memory for the storage of modifiable settings, the mobile telephone comprising:
    a memory for storing telephone numbers and associated names, wherein at least some of said memory can store individual values that represent modifiable settings for use in said at least one device and associated function names;
    a keyboard for addressing said memory; and
    means for interfacing said individual values that represent modifiable settings to said at least one device, wherein each modifiable settings is transferred to the memory of said at least one device based upon the associated function name corresponding to the modifiable setting.

9. A mobile telephone as claimed in claim 8, wherein the at least one device is a hands-free unit, and wherein a modifiable setting stored in the memory of the mobile telephone is the switch-off-time that the hands-free unit is operational.

10. A mobile telephone as claimed in claim 9, wherein the hands-free unit is for use in a car, and wherein the switch-off-time represents the time that said hands-free units is operational after the car is turned off.

11. A method for communicating modifiable settings from a mobile telephone to at least one device as claimed in claim 8,
    wherein the at least one device is an electrically adjustable driver's seat, and
    wherein one modifiable setting is a seat adjustment to which the electrically adjustable driver's seat is responsive.

12. A method for communicating modifiable settings from a mobile telephone to at least one device as claimed in claim 8,
    wherein the at least one device is a radio in a motor vehicle, and
    wherein modifiable settings of the radio include volume and frequency.

13. A method for communicating modifiable settings from a mobile telephone to at least one device, wherein the mobile telephone has a memory for storing telephone numbers and associated names and a keyboard for addressing said memory, and wherein the at least one device has a memory for storing modifiable settings, comprising the steps of:
    storing, by means of the keyboard, the individual values that represent modifiable settings and function names associated therewith in a portion of the memory of the mobile telephone otherwise used for storing telephone numbers and associated names, and
    interfacing the mobile telephone to the at least one device so that individual values representing modifiable settings are transferred to the memory of the at least one device based upon the associated function name associated with the modifiable setting as stored in the memory of the mobile telephone.

14. A method for communicating modifiable settings from a mobile telephone to at least one device as claimed in claim 13,
wherein the at least one device is a car hands-free unit, and
wherein one modifiable setting is the switch-off-time that the hands-free unit is operational after the car is turned off.

15. A method for communicating modifiable settings from a mobile telephone to at least one device as claimed in claim 13,
wherein the at least one device is an electrically adjustable driver's seat, and
wherein one modifiable setting is a seat adjustment to which the electrically adjustable driver's seat is responsive.

16. A method for communicating modifiable settings from a mobile telephone to at least one device as claimed in claim 13,
wherein the at least one device is a radio in a motor vehicle, and
wherein modifiable settings of the radio include volume and frequency.

* * * * *